July 13, 1937.   J. D. McINTYRE   2,086,568
NONSEPARABLE FASTENER
Filed July 8, 1936
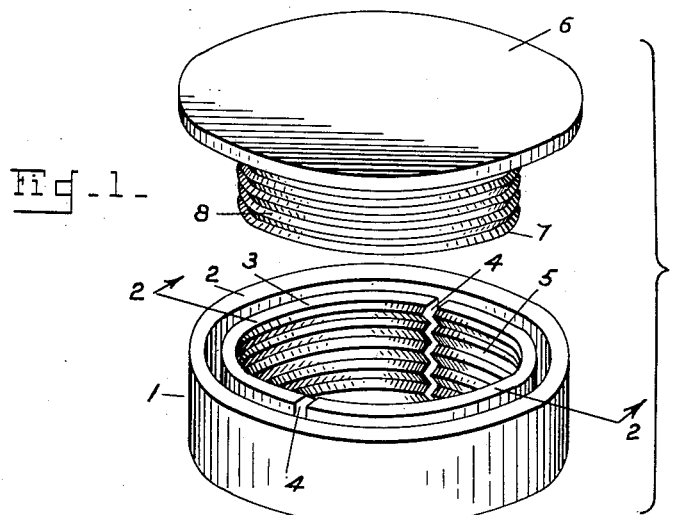
Fig-1-
Fig-2-   Fig-3-
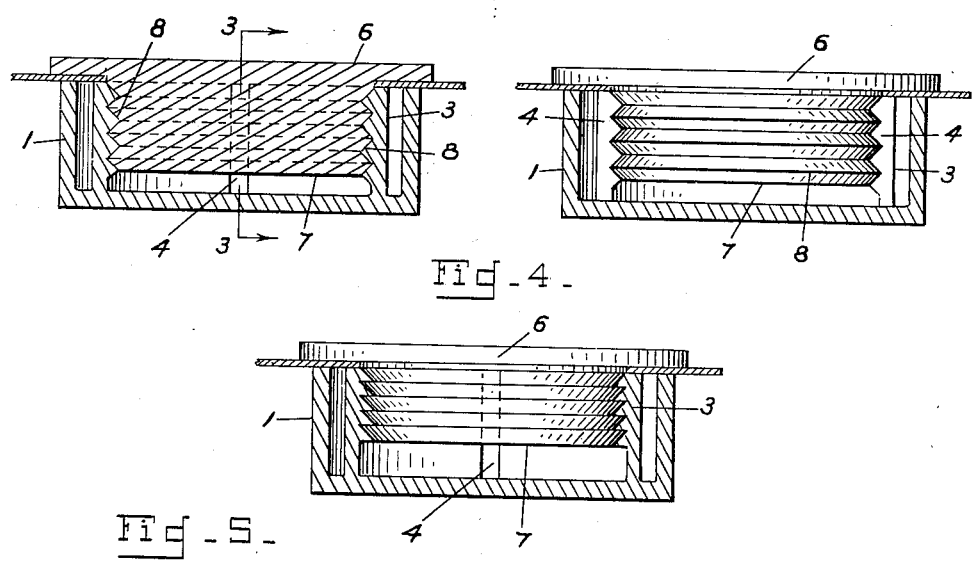
Fig-4-
Fig-5-
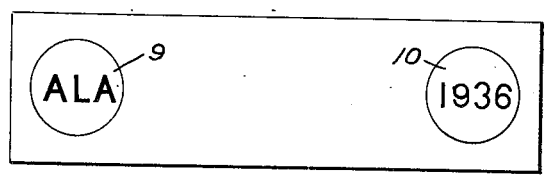
Inventor
James D. McIntyre
By W. N. Roach
Attorney

UNITED STATES PATENT OFFICE 2,086,568

NONSEPARABLE FASTENER

James D. McIntyre, Birmingham, Ala.

Application July 8, 1936, Serial No. 89,547

1 Claim. (Cl. 85—5)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a non-separable fastener, and is intended for use whenever such a fastening means is useful or desirable.

The main objects of the invention are the provision of a fastener of simple and cheap construction, which may be easily applied and which cannot be unfastened or which can be unfastened only with great difficulty without a special tool for that purpose.

To these and other ends, the invention consists in the construction, arrangement and combination of elements described hereinafter and pointed out in the claim forming a part of this specification.

A practical embodiment of the invention is illustrated in the accompanying drawing, wherein:

Fig. 1 is a perspective of the fastener with the parts separated;

Fig. 2 is a section of the fastener assembled taken on the line 2—2 of Fig. 1.

Fig. 3 is a section on the line 3—3 of Fig. 2, the stud shown in elevation;

Fig. 4 is a similar view of a modified form, and

Fig. 5 is an elevation of a plate with the fasteners in position to hold the same.

Referring to the drawing by numerals of reference:

The fastener consists of a body 1 formed with an outer flange 2 and an inner flange 3 spaced therefrom. The inner flange 3 is split as at 4 to permit resiliency and is formed on its inner surface with annular ridges 5 the walls of which are inclined as shown in Figs. 2 and 3 or only one wall of which is inclined as shown in Fig. 4.

Adapted for cooperation with the body is a stud having a head 6 adapted to close the opening to the body and a stem 7 formed with ridges 8 the walls of which are inclined to cooperate with the walls of the ridges 5.

If desired a legend may be stamped on the head of the stud as shown at 9 and 10.

In operation, the body is placed on one side of the parts to be fastened and in alignment with a suitable opening therein. The shank of the stud is then threaded through such opening and forced into the body flexing the inner flange until the ridges on the shank are seated in complemental grooves in the body.

When the ridges of the body and shank have both walls inclined, as in Figs. 1 and 2 the wedge shaped jaws of a suitable tool may be clamped under the head of the stud and the stud withdrawn. If, on the other hand, one wall of the ridges is perpendicular to the axis of the body and of the stud, as shown in Fig. 4 it will be impossible to separate the parts without destroying the structure.

I claim.

A non-separable fastener embodying a stud including a circular head, and a shank extending from the head, spaced annular ridges on the shank the entrant face of each ridge inclined; and a body to engage the shank including radially space annular flanges closed at one end the inner flange split longitudinally, and spaced annular ridges on the inner wall of the inner flange complemental to the ridges on the shank.

JAMES D. McINTYRE.